United States Patent [19]

Jungbluth

[11] 4,206,267
[45] Jun. 3, 1980

[54] COMPOSITE STRUCTURAL MATERIAL

[76] Inventor: Otto Jungbluth, Frankensteiner Strasse 99, 6100 Darmstadt-Eberstadt, Fed. Rep. of Germany

[21] Appl. No.: 971,912

[22] Filed: Dec. 21, 1978

Related U.S. Application Data

[63] Continuation-in-part of Ser. No. 859,465, Dec. 12, 1977, abandoned.

[51] Int. Cl.² .............................................. E04C 2/26
[52] U.S. Cl. ................................ 428/623; 52/309.14; 52/309.15; 52/309.16; 52/309.7; 52/309.8; 52/309.17; 428/138; 428/285; 428/313; 428/597; 428/626
[58] Field of Search ............... 428/138, 139, 285, 313, 428/621, 622, 623, 626, 596, 595, 597, 582–585; 52/309.13, 309.14, 309.16, 309.17, 309.15, 309.4–309.12; 260/2.5 AK

[56] References Cited

U.S. PATENT DOCUMENTS

| | | | |
|---|---|---|---|
| 2,234,517 | 3/1941 | Coffman | 428/622 |
| 2,902,854 | 9/1959 | Greene | 72/68 |
| 2,934,934 | 5/1960 | Berliner | 52/309.17 |
| 3,211,675 | 10/1965 | Johnson | 260/2.5 AK |
| 3,354,099 | 11/1967 | Stegenon | 260/2.5 AK |
| 3,753,933 | 8/1973 | Olstowski et al. | 260/2.5 AK |
| 3,775,240 | 11/1973 | Harvey | 428/70 |
| 3,826,762 | 7/1974 | Treadwell | 260/2.5 AK |
| 3,953,629 | 4/1976 | Wesch | 428/320 |
| 3,989,781 | 11/1976 | Chant | 428/313 |
| 3,993,822 | 11/1976 | Knauf et al. | 428/285 |
| 4,031,285 | 6/1977 | Miller et al. | 428/119 |
| 4,073,997 | 2/1978 | Richards et al. | 428/313 |
| 4,139,670 | 2/1979 | Fehlman | 428/614 |

FOREIGN PATENT DOCUMENTS

| | | | |
|---|---|---|---|
| 287984 | 2/1971 | Austria. | |
| 1609482 | 3/1970 | Fed. Rep. of Germany. | |
| 2063546 | 1/1971 | Fed. Rep. of Germany | 428/313 |
| 2544830 | 4/1976 | Fed. Rep. of Germany | 428/313 |
| 51-20427 | 2/1976 | Japan | 52/309.14 |
| 7002571 | 2/1969 | Netherlands | 428/313 |
| 7111316 | 2/1972 | Netherlands | 428/313 |

Primary Examiner—L. Dewayne Rutledge
Assistant Examiner—Michael L. Lewis
Attorney, Agent, or Firm—Frishauf, Holtz, Goodman & Woodward

[57] ABSTRACT

A composite structural material is disclosed which comprises a profiled steel sheet and an insulating layer bonded to the profiled steel sheet on at least one side thereof, said insulating layer comprising an expanded mineral core layer bonded with an inorganic binder or a mixture of inorganic binder and a small amount of organic binder. The steel sheet has joining means extending therefrom and into the insulating layer. The composite structural material may be used as a roof material.

21 Claims, 8 Drawing Figures

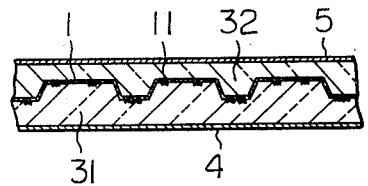
Fig. 3
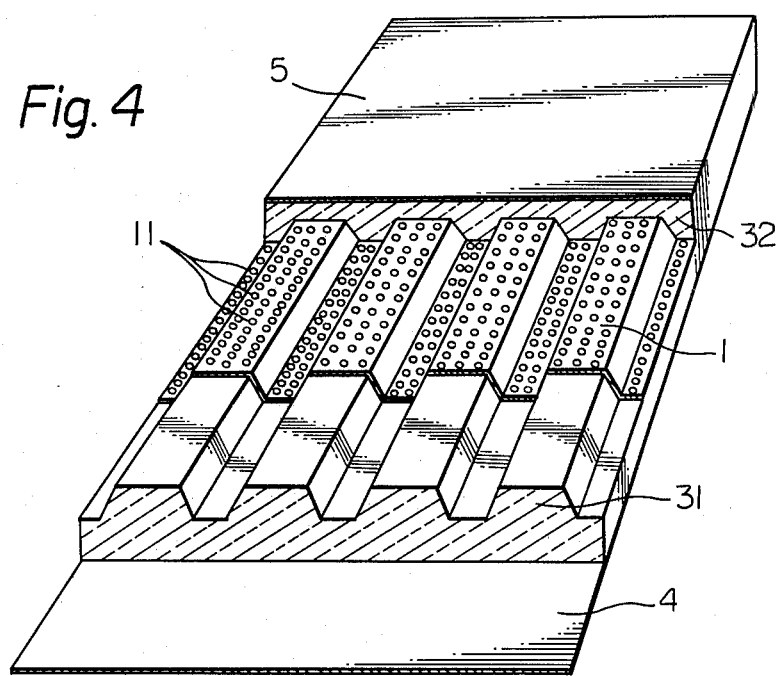
Fig. 4
Fig. 5
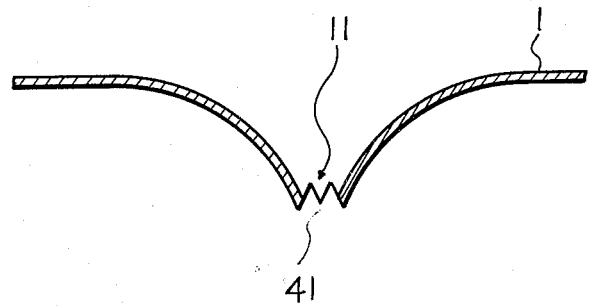

COMPOSITE STRUCTURAL MATERIAL

CROSS REFERENCE TO RELATED APPLICATION

This application in a Continuation-In-Part of my copending application Ser. No. 859,465, filed Dec. 12, 1977, now abandoned.

BACKGROUND OF THE INVENTION

This invention relates to a composite sheet and a roof structural material comprising a wide profiled steel sheet to which is bonded an insulating layer comprising an expanded mineral core layer bonded with an inorganic binder or a mixture of an inorganic binder and a small amount of organic binder and reinforced with a thin mineral fiber reinforced covering layer covering at least one of said insulating layers.

A roof structural material requires geometric, static and physical structural properties to provide enclosure of a space, stability against deformation, supportability, insulation from heat and sound and protection from fire. The conventionally used materials such as steel, aluminum, reinforced concrete and wood provide the load supporting function and also enclose a space when assembled on a plane, but the special physical requirements for roofing can be obtained only by the use of additional insulating materials or components.

SUMMARY OF THE INVENTION

An object of this invention is to cover a narrow and relatively slightly profiled steel sheet with an extremely light and non-inflammable insulating material which can provide high heat-insulating value even in a thickness of only several centimeters and at the same time can protect the steel sheet from fire.

It is another object of the invention to select the structural geometry and combination of the components so that notwithstanding its relatively low strength and elasticity, the insulating layer not only helps to prevent deformation of the profiled steel sheet under load, but also to carry a part of the static load.

Other objects and advantages of this invention will become apparent to those skilled in the art from the following description and drawings.

BRIEF DESCRIPTION OF THE DRAWINGS

FIG. 3 shows a longitudinal sectional view of a five layered composite sheet.

FIG. 4 shows a perspective view of FIG. 3 with a partial sectional view.

FIG. 5 shows a longitudinal sectional view of a punched thorny aperture.

DESCRIPTION OF THE PREFERRED EMBODIMENT

Figure 1:
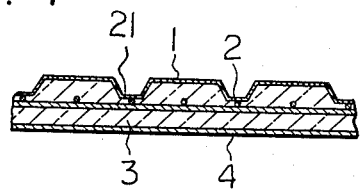
FIG. 1 shows a longitudinal sectional view of a three layered composite sheet.
Figure 2:
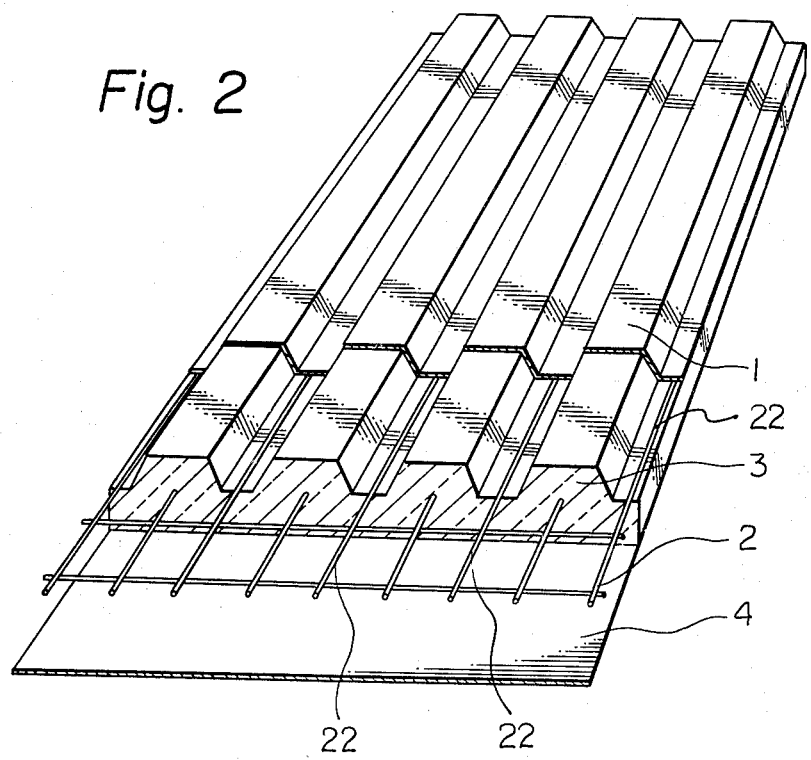
FIG. 2 shows a perspective view of FIG. 1 with a partial sectional view.

The bond formed between the formed steel sheet and insulating layer by the binder is not so strong and due to the relatively low strength of the core layer, the latter cannot bear local strains transmitted through conventional fixtures such as bolt-headed connectors in composite girders. Therefore, at least one side of the profiled steel sheet 1 according to this invention is provided with closely distributed joining means which penetrate into said insulating layer, the joining means comprising a welded structural steel mat 2 (FIGS. 1 and 2) or a great number of punched thorny apertures 11 (FIGS. 3 and 4) in the horizontal upper and lower flanges or surfaces of the profiled steel sheet, said punched thorny apertures 11 being conically shaped and their borders being indented (FIG. 5). This indented form leads to claw- or barb-like engagement or catching between the steel and the insulating layer and strengthens the bond. The thorny apertures are preferably distributed over substantially the complete transverse surfaces of the profiled steel sheet, as seen in FIG. 4. The barbs formed by the thorny apertures form a generally frusto-conical shape and extend into the insulating layer to increase the shear strength between the insulating layer and the profiled steel sheet. The open bottoms 41 of the barbs improved adhesion therebetween.

The steel mat 2 (FIGS. 1 and 2) is a mesh-like mat formed of steel bars or wires welded together at crossings thereof. Alternate longitudinal bars 22, for example, are welded to the horizontal or transverse inner surface 21 of the profiled steel sheet 1. Mat 2 extends into the insulating layer to increase the strength of the insulating layer as well as to increase the shear strength between the insulating layer and the profiled steel sheet.

The density of light-weight concrete made of expanded clay or expanded slate for structural construction ranges ordinarily from 1.4 to 1.8 ton/m$^3$. However, the insulating layer according to this invention has an extremely low density ranging from only 0.3 to 0.4 ton/m$^3$ which is achieved by application of expanded minerals of extremely low density such as perlite. As a binder, cement or a mixture of cement and polyurethane is used. By the use of polyurethane foam in a mixture of expanded mineral and cement binder, the density of the structural insulating layer is reduced further without loss of its superior heat insulation and at the same time its strength is improved. A special advantage which is valuable architecturally is that, because the setting time of perlite concrete is substantially reduced by the exothermic reaction of the polyurethane foam, the composite structural materials can be produced rapidly. Organic polyurethane is combustible, but as it is embedded in the inorganic material, a fire resistance of 90 minutes by the ISO (International Standardization Organization)-time temperature curve can be achieved for the composite structural materials, the same as for a perlite insulating layer bonded only with cement.

The excellent fire resisting characteristic of the perlite insulating layer bonded with cement and polyurethane remains even when the proportion of polyurethane included is from 20 to 30% by weight. Even if the polyurethane is limited to a proportion up to 8% by weight of the total weight of the insulating layer, fire resistance which is substantially incombustible will be achieved. In order to utilize the low strength resulting from the low density of the structural insulating layer in the transference of load and in order to keep the insulating layer free from cracks under the condition beyond the limit of the working load, tensile stress is provided by a thin mineral fiber reinforced covering layer which comprises a glass fiber mat about 2 mm thick that preferably is embedded in the cement layer. Such a thin mineral fiber reinforced covering layer can provide relatively high tensile stress when a profiled steel sheet lies in the compression zone.

Experiments have shown that such a three-layer composite structural material with an insulating layer 7 cm thick has a thermal insulation value K=0.7 watt/m$^2$°K., fire resistance of 90 minutes and bearing capacity double that of the profiled steel alone. Thus it can be seen that composite has a total support strength substantially greater than the steel sheet alone, with insulation efficiency resulting from a continuous insulating covering over the profiled sheet as shown in the figures.

The composite structural materials according to this invention can be flat, triangle shaped or Z shaped. A two-piece composite structural material of triangle shape with a basic breadth of 2.4 m and a profile height of about 1 m can cover, for example, with 2 mm thickness of steel sheet, a span of more than 25 m supporting a working load of 75 Kg/m$^2$ of snow.

The essence of this invention lies in the fact that with less work, through a particular shaping of wide strip steel to increase stiffness and using composite structural materials comprising mainly inorganic, very light insulating and thin mineral fiber reinforced covering layers of high tensile strength, the important qualities of roofs such as load carrying capacity, resistance to bending deformation, fire resistance, and heat and sound insulation have been achieved "in toto" and "in situ" in one integrated constructional material.

The following are given to further illustrate this invention with reference to the drawings.

The composite structural material comprises the profiled steel sheet 1 preferably of trapezoidal form with a welded structural steel mat 2 (FIGS. 1 and 2) or punched thorny apertures 11 (FIGS. 3 and 4), expanded mineral layer 3 and glass fiber textile layer 4. For composite structural materials which might be exposed to fire on both sides, the profiled steel sheet has structural insulating layers bonded to both sides (FIGS. 3 and 4) and the outer layer 32 which does not cooperate statically is made less thick than the inner sandwiched layer 31. Hence, special joining means for the outer layer 32 is not necessary. Instead of a textile glass fiber covering layer, the outer insulation layer 32 is covered with a waterproof insulation layer 5.

Figure 6:
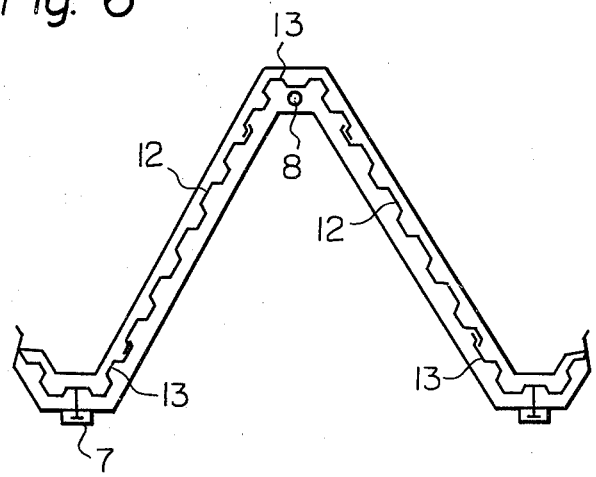
FIG. 6 shows a composite laminated material having a sectional shape of a triangle.

In the composite structural materials having a triangle shape section as shown in FIG. 6, the profiled steel sheet comprises two unfolded inclined parts 12 and three tray-like flange parts 13 of the same geometrical shape.

Figure 7:
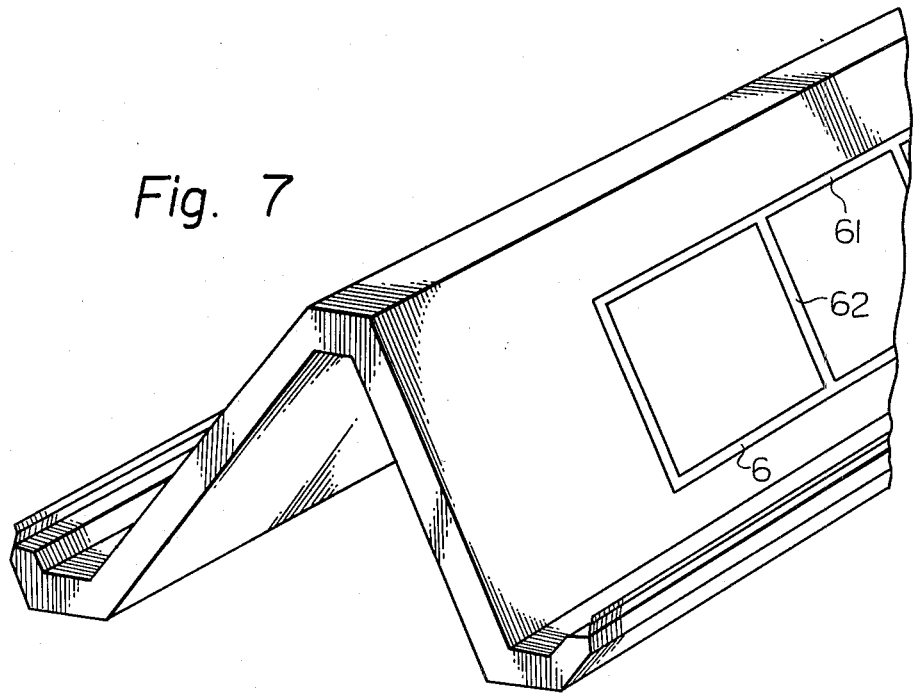
FIG. 7 shows a perspective view of the laminated material of FIG. 6.
Figure 8:
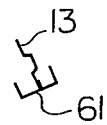
FIG. 8 shows a steel flange 61 welded to the composite structural flange 13.

When the composite structural material is provided with a skylight according to FIG. 7, one of the inclined parts 12 is replaced by a framework 6 having the same load carrying capacity and the same fire resistance rating as those of the composite structural part. The framework 6 is composed of profiled steel flanges 61 which are welded to the profiled steel sheet 1 of the composite structural flange 13 and profiled steel struts 62 which are connected to the frame flanges 61 rigidly. The outer periphery of the profiled steel of the frame beam 6 which can be formed open, hollow or as reinforced concrete ribbed bars is covered either by a structural insulation layer or by normal concrete, and the covering material itself is constructed to accommodate for the installation of glass plates.

Utility piping such as heating pipes 7 and electric cable 8 can be installed in the expanded mineral core as shown in FIG. 6.

I claim:

1. In composite structural materials comprising a profiled steel sheet and an insulating layer bonded to the profiled steel sheet on at least one side thereof, the improvement wherein;
   said insulating layer comprises an expanded mineral core layer bonded with an inorganic binder or a mixture of an inorganic binder and a small amount of organic binder and has a density not more than 0.4 ton/m$^3$; and a thin mineral fiber reinforced covering layer covering at least one of said insulating layers; and
   said profiled steel sheet has a generally trapezoidal cross-section and includes joining means, said joining means comprising closely spaced punched thorny apertures formed in said profiled steel sheet and which form barb-like projections which are directed toward and which penetrate into said insulating layer;
   said composite having a total support strength substantially greater than the steel sheet alone and comprising a substantially continuous insulating covering over the profiled sheet.

2. Composite structural materials according to claim 1 wherein said joining means comprises a plurality of punched protrusions formed in said profiled steel sheet, said punched protrusions having wall portions extending from the main surface of said profiled steel sheet, said protrusions each having open ends at the ends of said wall portions, said open ends defining said thorny apertures, said wall portions penetrating into said insulating layer and improving the shear strength between said insulating layer and profiled steel sheet.

3. Composite structural materials according to claim 2 wherein said wall portions define a substantially frusto-conical shape.

4. Composite structural materials according to any one of claim 2 or 3 wherein said punched thorny apertures are formed over substantially the complete surface of said profiled steel sheet.

5. In composite structural materials comprising a profiled steel sheet and an insulating layer bonded to the profiled steel sheet on at least one side thereof, the improvement wherein:
   said insulating layer comprises an expanded mineral core layer bonded with an inorganic binder or a mixture of an inorganic binder and a small amount of organic binder and has density not more than 0.4 tom/m$^3$; and a thin mineral fiber reinforced covering layer covering at least one of said insulating layers;
   said profiled steel sheet has a generally trapezoidal cross-section; and
   a joining means is secured to said profiled steel sheet, said joining means comprising a welded structural steel mat fixedly secured to the profiled steel sheet and extending away from said side of said profiled sheet facing said insulating layer, said steel mat penetrating into said insulating layer;
   said composite having a total support strength substantially greater than the steel sheet alone and comprising a substantially continuous insulating covering over the profiled sheet.

6. Composite structural materials according to claim 5 wherein said welded structural steel mat comprises a mesh-like structure.

7. Composite structural materials according to claim 6 wherein said profiled steel sheet has transverse or horizontal surfaces, said welded steel mat being welded to horizontal or transverse inner surfaces of said profiled steel sheet.

8. Composite structural materials according to claim 7 wherein alternate members of said meshlike steel mat are welded to said transverse or horizontal inner surfaces.

9. Composite structural materials according to claim 1 or 5 wherein the insulating layer comprises perlite bonded with cement.

10. Composite structural materials according to claim 1 or 5 wherein the weight percentage of the organic binder is up to 8% of the insulating layer.

11. Composite structural materials according to claim 1 or 5 wherein the insulating layer comprises perlite bonded with cement and polyurethane.

12. Composite structural materials according to claim 11 wherein the weight percentage of polyurethane is up to 8% of the insulating layer.

13. Composite structural materials according to claim 1 or 5 wherein the thin material fiber reinforced covering layer comprises a glass fiber mat.

14. Composite structural materials according to claim 1 or 5 comprising an insulating layer bonded on both sides of said profiled steel sheet and wherein the outer surface of the insulating layers is provided with a waterproofing insulating layer.

15. Composite structural materials according to claim 14 wherein said profiled steel sheet is substantially horizontally oriented, one of said insulating layers is located on the bottom of said profiled steel sheet and the other of said insulating layers is located on the upper surface of said profiled steel sheet, said lower insulating layer being thicker than said upper insulating layer and said joining means is provided to penetrate only into said lower insulating layer.

16. Composite structural materials according to claim 1 or 5 wherein the composite structural materials are flat.

17. Composite structural materials according to claim 1 or 5 wherein the structural materials are formed as assembled structural materials and have inclined portions having a triangle-shaped or Z-shaped section.

18. Composite structural materials according to claim 17 wherein a framework having the same strength and fireproofing property is built into the inclined portion of the assembled structural materials.

19. Composite structural materials according to claim 17 wherein said framework includes flanges and struts; the outer periphery of the flagnes and struts of said framework define open or hollow profiles and are covered with the structural insulating layer of the composite structural materials or with normal concrete; and said flanges are welded to the profiled steel sheet.

20. Composite structural materials according to claim 18 wherein said framework includes flanges and struts, and wherein the flanges of the framework are welded to joint sheets screwed rigidly to the struts of the framework.

21. Composite structural materials according to claim 1 or 5 further comprising utility piping incorporated in the insulating layer.

* * * * *

UNITED STATES PATENT AND TRADEMARK OFFICE
CERTIFICATE OF CORRECTION

PATENT NO. : 4,206,267
DATED : June 3, 1980
INVENTOR(S) : Otto JUNGBLUTH

It is certified that error appears in the above-identified patent and that said Letters Patent are hereby corrected as shown below:

In the heading of the patent, add the following priority data:

--January 7, 1977   Fed. Rep. of Germany   27 00 416 --.

Column 1, line 50, before "with" insert --,--;
line 54, before "with" insert --,--;

Column 3, line 11, change "that composite" to --that the composite--;

Column 4, line 40, change "to-conical shape" to --toconical shape--.

Signed and Sealed this

Eleventh Day of November 1980

[SEAL]

Attest:

SIDNEY A. DIAMOND

Attesting Officer

Commissioner of Patents and Trademarks